3,179,125
ONE MOTOR MIXING BOX
James C. O'Day, Port Washington, and George J. Sweeney, Plandome, N.Y., assignors to Air Devices, Inc., New York, N.Y., a corporation of New York
Filed Oct. 7, 1960, Ser. No. 61,148
16 Claims. (Cl. 137—607)

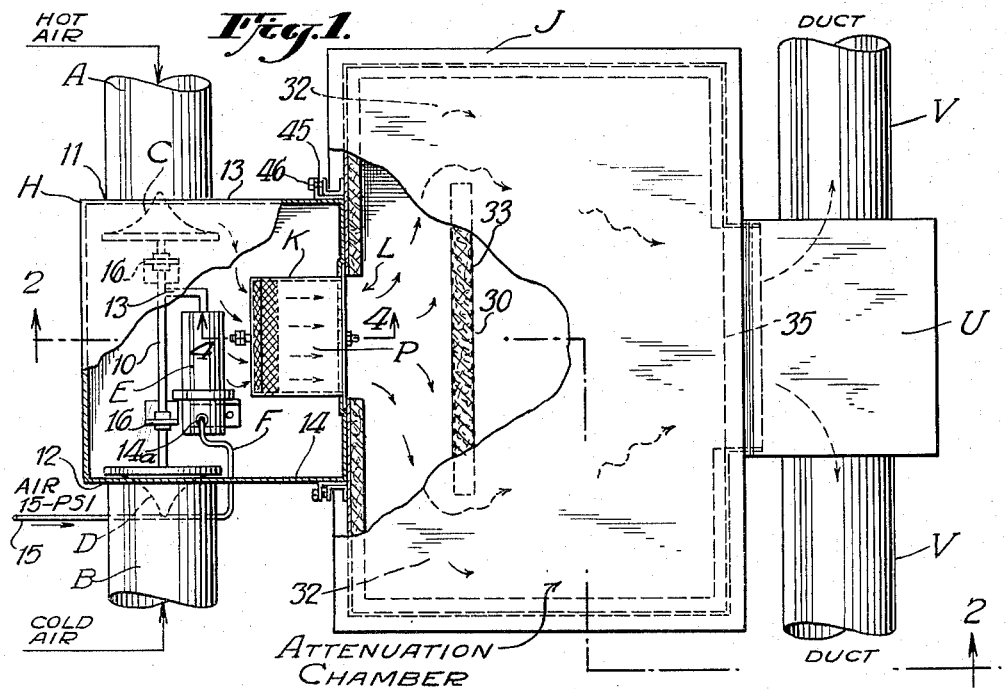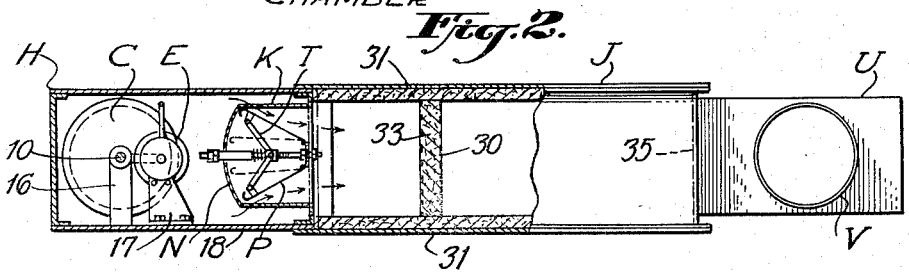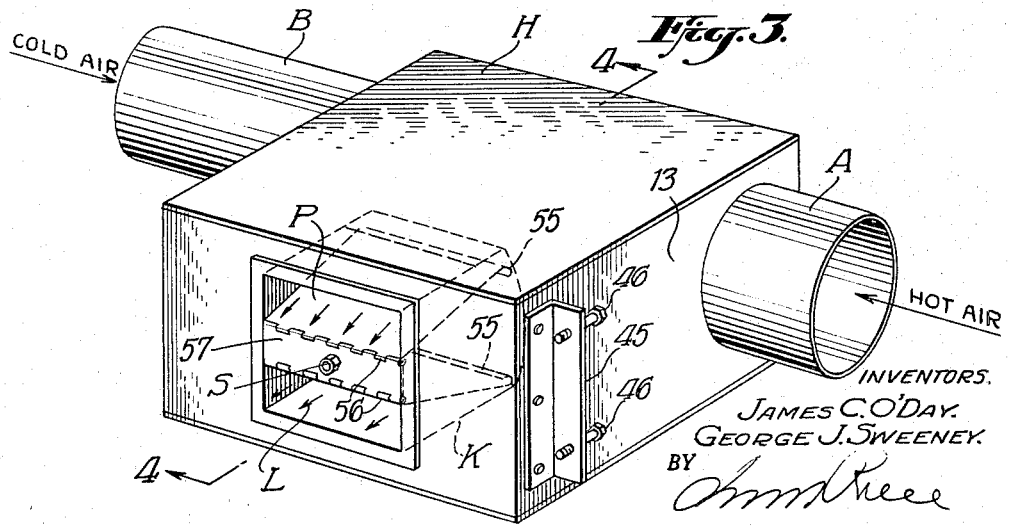

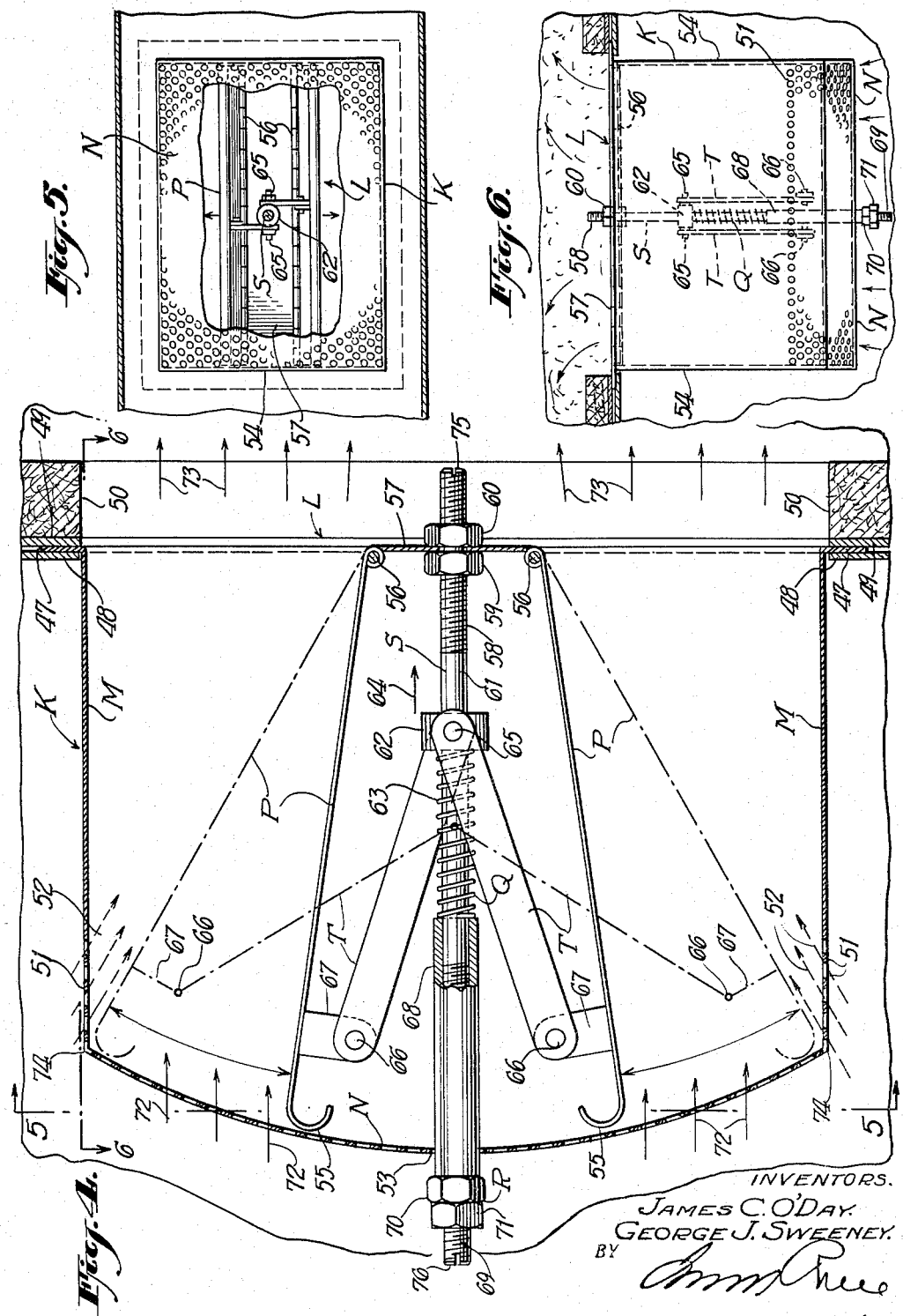

The present invention relates to a mixing box ararngement, and it particularly relates to a mixing box arrangement which is designed to provide a proper mixture of hot and cold air from relatively high pressure, high velocity conduits, and supply it to an enclosure, such as a room, office or other working or dwelling space at proper temperature and volume and at reduced pressure and velocity.

It is among the objects of the present invention to provide a relatively simple reliable self-contained constant volume flow device which will control the flow of high pressure, high velocity air and supply it to ducts or outlets in proper volume from whence it is distributed to an air conduit or outlets to the rooms, offices or enclosures to be supplied with ventilated or conditioned air.

Another object is to provide a novel mixing box arrangement which will have a minimum number of moving parts and motors and which will accommodate itself without excessive manual adjustment or regulation to the flow of hot and cold air assuring a substantially constant volume and required temperature thereof being transmitted at reduced pressure and velocity to a duct or air outlets.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above object, it has been found most suitable to provide a mixing box with an inlet valve chamber.

This chamber is provided with high pressure and high velocity hot air and cold air inlet ducts controlled by opposed valves desirably mounted to move together so that the total flow of air whether hot or cold will be constant.

The hot and cold inlet valves are mounted on a common shaft and are operated by a single actuating motor which is controlled by thermostat. This controls the temperature of the delivered air.

The flow control is regulated by a vane type, constant flow valving device which is actuated solely by air passing through the box.

In the preferred form of the invention, the inlet valve chamber is attached to the larger attenuation chamber. The constant flow valve is mounted in such a manner that all air passing from one chamber to the other must pass through the valve, insuring a constant volume of air flow leaving the mixing box.

In one form, the constant flow valve has imperforate base walls and an imperforate bottom wall over which the vanes will swing, opening and closing an additional area thereof depending upon the pressure and flow of mixed hot and cold air which has been released in the valve box by the hot and cold valves.

The vanes are normally biased to a position permitting maximum flow by a spring the strength of which may be adjusted.

However, the flow of air under pressure will tend to separate the vanes against the force of the spring and cause the vanes to block the perforated wall, creating a lesser free area for air flow.

The swinging vanes will automatically regulate the flow so that it will be constant at all times since increased pressure will tend to separate the vanes against the biasing spring, while reduced pressure will cause the vanes to come together under the force of the spring.

This will give an automatic adjustment without manual innovation and with a minimum of adjustment over long periods of time with varying temperatures and climatic conditions.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

FIG. 1 is a plan view of the combination mixing box of the present invention partly broken away to show the interior of the valve chamber with the intermediate control vane arrangement.

FIG. 2 is a transverse sectional view upon the line 2—2 of FIG. 1.

FIG. 3 is an isometric view of the vane chamber by itself showing the outlet of the intermediate chamber from the side to which it is connected to the main mixing box and upon an enlarged scale as compared to FIGS. 1 and 2.

FIG. 4 is a transverse sectional view taken upon the line 4—4 of FIGS. 1 and 3, and upon an enlarged scale as compared to FIGS. 1 and 3.

FIG. 5 is a fragmentary transverse sectional view taken upon the line 5—5 of FIG. 4 and upon a reduced scale as compared to FIG. 4.

FIG. 6 is a transverse sectional view taken upon the line 6—6 of FIG. 4, and upon a reduced scale as compared to FIG. 4.

Referring to FIGS. 1 to 3, there is shown a hot air inlet A, a cold air inlet B with associated hot air inlet valve C and cold inlet valve D.

The air passing through conduits A and B is under relatively high pressure and velocity, and it is the purpose of the mixing box of the present invention to result in a proper mixture of hot and cold air to give the desired temperature control and also to reduce the pressure and velocity and maintain a constant volume.

There is provided a single actuator or motor E which will move both inlet valves mounted on a common shaft and which is desirably controlled by a connection F from a thermostat.

The inlet valve chamber H is mounted on and connected to the attenuation chamber J with an intermediate vaned control device which forms an important feature of the present invention as shown in FIGS. 4 to 6 particularly.

The intermediate constant flow regulator K will control flow through the passageway L between the inlet valve chamber H and the attenuation chamber.

The constant flow valve itself has the substantially imperforate side walls M and a perforate base wall N with the swinging control vanes P.

These control vanes are biased toward closed position or together by the adjustable coil spring Q.

The spring Q has an adjustment R which may be set at the factory or by a maintenance man and which is associated with a central guide rod S.

The vanes are provided with the linkage T which controls their reciprocating movement and assures that both vanes will open and close together.

Referring particularly to FIGS. 1 to 3, the hot air valve C and the cold air valve D are connected together by the rod 10, and they will oscillate between hot air valve seat 11 and the cold air valve 12 in the side walls 13 and 14 of the valve box H.

The motor or actuator E will have a mechanical connection 13 to move the rod backwardly and forwardly, and the motor E has a connection at 14a from the thermostat.

The thermostat may control the flow of air under pressure through the conduit F (see FIG. 1) to cause such pressure to be applied to actuate the motor E.

The rod 10 connecting the hot air valve C and the cold air valve D is carried by a bracket or brackets 16 which will guide the reciprocating movement.

The motor E will be provided with a bracket or brackets 17 which is mounted on the wall 18 of the valve box H.

The connection from the thermostat to the control motor E is indicated at F in FIG. 1.

The thermostat in operation will move the valves C and D toward or away from the seats 11 and 12 to give warmer or colder mixtures of air and thus control the temperature of air from the inlet valve chamber H to the attenuation chamber J and thence to the outlet conduit systems U and V.

Referring to FIGS. 1 and 2, after the air passes through the constant flow valve K and through the inlet L into the attenuation chamber J, it will strike the baffle 30 extending between the walls 31 of the box J but having the open flow spaces at 32 (see FIG. 1).

This baffle 30 consists of a perforated metal wall filled with glass fiber or other sound deadening material 33.

The air will then flow out at 35 into the outlet box U.

From the outlet box U, the proper mixture of hot and cold air will be distributed at low pressure and low velocity through the duct system V to the conditioned space.

Referring particularly to FIGS. 1 and 3, the inlet valve chamber has the mounting flanges 45 upon the walls 13 and 14 which carry the mounting bolts 46.

The constant flow valve itself as indicated in FIGS. 4, 5 and 6 has the side walls M with the outwardly extending flanges 47 which are clamped between the wall portions 48 and 49, the latter being at the inlet side of the attenuation chamber J.

The wall portions 49 are provided with a 1" lining as indicated at 50 of glass fibers which is coated on one side with vinyl plastic.

The walls M are provided with perforate portions 51, which will permit the flow of air as provided by the arrows 52 regardless of the position of the vanes P.

The arcuate base wall N has a central opening 53 to receive the rod S, and it is perforated over its entire width and length as indicated in FIGS. 4, 5 and 6.

The end walls 54 of the intermediate box K are imperforated.

The vanes P will also be imperforate, and the end portions 55 which may be of varying shape will sweep over the perforate plate N.

These vanes will sweep from the solid line position to the dot and dash line position as shown in FIG. 4.

The vanes P are hinged at 56 on the side edges of the plate 57 which is positioned in the opening L from the intermediate position K to the attenuation chamber J.

The plate extends between the wall 54 as shown in FIG. 5 and carries the both hinges 56 as well as the rod S and the adjustment R.

The rod S has a threaded portion 58 which is clamped in adjusted position by the nuts 59 and 60 (see FIG. 4) upon the plate 57.

The unthreaded portion 61 of the rod S will carry the sliding collar 62 against which the spring 63 reacts tending to bias the collar 62 in the direction 64 (see FIG. 4).

The collar has pivot pins 65 projecting from its opposite sides which carry the links T (see FIG. 4).

The links at their outer ends are connected by the pivots 66 to the inwardly projecting bars 67 on the vanes P.

The spring Q encircles the rod S, and its tension is regulated by the adjustable sleeve 68 (see FIG. 4).

The sleeve 68 fits over the threaded portion 69 of the rod S.

The nut 70 may be used to adjust the sleeve 68 to vary the tension on the spring Q, and it is locked in position by means of the nut 71.

In operation, the force of the flowing air as indicated by the arrows 72 as shown in FIG. 4 will press against the inside faces of the vanes P tending to move them from the solid line position to the dot and dash line position of FIG. 4.

This will be against the spring Q which tends to press the collar 62 upwardly and to bring the vanes P together through the linkage.

The greater the force of the air, the more the vanes P will separate, and the lower the force of the air, the more the vanes P will come together.

As the vanes separate, they will block off a greater area in the base wall N thus giving an automatic adjustment so as to maintain a constant volume of air flowing through the opening L as indicated by the arrows 73 in FIG. 4.

Although the side walls M may be imperforate down to their junction point 74 with the base wall N (see FIG. 4), nevertheless, the lower perforated portion 51 will always permit a relatively small flow of air as indicated by the arrows 52 so that there will not be the effect of a complete cutoff when the ends 55 are at the corners 74 as indicated by the dot and dash positions of the vanes P.

The arrangement shown gives a completely automatic control not requiring continuous outside adjustment, which may be set once, with assurance that there will be a continuous operation over long periods of time with a constant volume effect.

The nut arrangement 59 and 60 on the threaded portion 58, and 70 and 71 on the threaded portion 69 of the rod will give a double adjustment, and fillister slots are provided at 75 and 76 on both ends of the rod S.

As many changes could be made in the above one motor mixing box, and many widely different embodiments of this invention could be made without departing from the scope of the claims, it is intended that all matter contained in the above description shall be interpreted as illustrative and not in a limiting sense.

Having now particularly described and ascertained the nature of the invention, and in what manner the same is to be performed, what is claimed is:

1. A constant flow valve for a mixing box arrangement of the type having an inlet valve chamber and an attenuation chamber receiving hot and cold air therefrom, hot and cold air inlet conduits leading into the valve box, hot and cold air valves controlling said inlet conduits; said constant flow valve including an outlet automatic valve compartment extending into said inlet valve chamber and positioned between said hot and cold valves and having four side walls, two transverse to the inlet conduits and two parallel to the inlet conduits and a bottom arcuate curved wall having a radius in a plane parallel to the direction of the conduits and extending between the transverse side walls and perforated over its entire area, said compartment including spring biased closure means actuated by the air flow to control the flow area through said perforated wall, said closure means including a fixed shaft projecting centrally through said outlet compartment transversely to said conduits and mounted at one end on the outlet side of the chamber carrying the compartment and at its other end projecting through the center of said arcuate curved wall, a sliding sleeve on said shaft having pivotally connected links extending to and actuating said closure means adjacent the arcuate curved wall.

2. A constant flow valve for a mixing box arrangement of the type having an inlet valve chamber and an attenuation chamber receiving hot and cold air therefrom, hot and cold air inlet conduits leading into the valve box, hot and cold air valves controlling said inlet conduits; said constant flow valve including an outlet automatic valve compartment extending into said inlet valve chamber and positioned between said hot and cold valves and having four side walls, two transverse to the inlet conduits and two parallel to the inlet conduits and a bottom arcuate curved wall having a radius in a plane parallel to the direction of the conduits and extending between the transverse side walls and perforated over its entire area, said compartment including spring biased closure means actuated by the air flow to control the flow area through said perforated wall, said closure means consisting of vanes sweeping across said perforated wall to decrease or increase in area the perforated wall, said closure means including a fixed shaft projecting centrally through said outlet compartment transversely to said conduits and mounted at one end on the outlet side of the chamber carrying the compartment and at its other end projecting through the center of said arcuate curved wall, a sliding sleeve on said shaft having pivotally connected links extending to and actuating said closure means adjacent the arcuate curved wall.

3. A constant flow valve for a mixing box arrangement of the type having an inlet valve chamber and an attenuation chamber receiving hot and cold air therefrom, hot and cold air inlet conduits leading into the valve box, hot and cold air valves controlling said inlet conduits; said constant flow valve including an outlet automatic valve compartment extending into said inlet valve chamber and positioned between said hot and cold valves and having four side walls, two transverse to the inlet conduits and two parallel to the inlet conduits and a bottom arcuate curved wall having a radius in a plane parallel to the direction of the conduits and extending between the transverse side walls and perforated over its entire area, said compartment including spring biased closure means actuated by the air flow to control the flow area through said perforated wall, said closure means forming an obstruction between the inlet valve chamber and the main attenuation chamber and having side walls parallel to the direction of flow with relatively small flow arising therein and having a base wall transverse to the direction of flow which is perforated over its full length and width, said closure means including a fixed shaft projecting centrally through said outlet compartment transversely to said conduits and mounted at one end on the outlet side of the chamber carrying the compartment and at its other end projecting through the center of said arcuate curved wall, a sliding sleeve on said shaft having pivotally connected links extending to and actuating said closure means adjacent the arcuate curved wall.

4. A constant flow valve for a mixing box arrangement of the type having an inlet valve chamber and an attenuation chamber receiving hot and cold air therefrom, hot and cold air inlet conduits leading into the valve box, hot and cold air valves controlling said inlet conduits; said constant flow valve including an outlet automatic valve compartment extending into said inlet valve chamber and positioned between said hot and cold valves and having four side walls, two transverse to the inlet conduits and two parallel to the inlet conduits and a bottom arcuate curved wall having a radius in a plane parallel to the direction of the conduits and extending between the transverse side walls and perforated over its entire area, said compartment including spring biased closure means actuated by the air flow to control the flow area through said perforated wall, and means for adjusting said spring to regulate the air pressure under which said closure means is operated, said closure means including a fixed shaft projecting centrally through said outlet compartment transversely to said conduits and mounted at one end on the outlet side of the chamber carrying the compartment and at its other end projecting through the center of said arcuate curved wall, a sliding sleeve on said shaft having pivotally connected links extending to and actuating said closure means adjacent the arcuate curved wall.

5. An inlet valve for a mixing box arrangement to produce a proper mixture of hot and cold air from a high pressure chamber receiving high pressure, high velocity hot and cold air from high pressure, high velocity conduits and to supply the mixture to an enclosure comprising a valve chamber having side walls, end walls and a partial cylindrical inlet wall connecting the ends of the side walls and the side walls and the inlet wall extending between the end walls and the partial cylindrical wall being perforated and a pair of swinging valve plates moving across the partial cylindrical inlet wall to control the flow of air therethrough and hinge means for said plates located at the outlet side of the valve chamber opposite to the inlet wall and a fixed shaft centrally extending through said valve midway between said side and end walls, a sliding collar on said shaft pivotally mounted links extending between said collar and the ends of the valve plates adjacent the cylindrical inlet wall.

6. The valve of claim 5, said side walls being perforated adjacent the inlet wall and spring means to bias said valve plates together.

7. The valve of claim 5, said plates having curved end portions for sweeping over said perforated inlet wall.

8. The valve of claim 5, coil spring means positioned on and encircling said shaft to act against said collar to bias said valve plates together and an adjustable sleeve to control the compression on said spring.

9. The valve of claim 5, said valve plates being rectangular and being pivotally mounted adjacent to but removed from said shaft at the outlet side of the valve chamber and being positioned so that their swinging ends are closely adjacent to the perforated plate.

10. The valve of claim 5, said outlet side being provided with a central metal strip extending between the end walls and carrying said hinge means which extend between said end walls, said end walls being imperforate and said side walls being perforate adjacent the partial cylindrical wall so as to permit the flow of air at all times regardless of the position of the hinge plates.

11. The valve of claim 5, by-pass means around said valve positioned in the side walls of said inlet valve.

12. A constant flow valve for a one motor mixing box for generating a proper mixture of hot and cold air from relatively high pressure, high velocity hot and cold air conduits and supplying the mixture at reduced temperature and velocity to an enclosure, said box comprising a mixing chamber having hot and cold air inlet sides and an outlet side, said inlet sides having inlet ports and said outlet side having an outlet opening, hot and cold valves to control said ports, a motor actuating said valves; said constant flow valve including an outlet valve box-like compartment enclosing said outlet opening and positioned between said inlet and outlet ports and having a perforate inlet wall, opposite imperforate side walls and opposite end walls forming said box-like compartment, a pair of swinging vanes having outer ends sweeping across said perforate inlet wall, pivot mounts for said vanes mounted at said outlet side, a shaft extending transversely through said outlet side and centrally through said inlet wall and between said vanes, a sliding collar on said shaft and pivotally mounted links extending between said collar and said vanes and resilient means to bias said vanes together, the flow of air through said inlet wall moving the vanes apart to control the air flow through the inlet wall.

13. The box of claim 12, said opposite end walls being perforate adjacent said inlet wall to provide a permanent bypass.

14. The box of claim 12, said resilient means consisting of a coil spring encircling said shaft and reacting against said collar and means to adjust the resiliency of said spring.

15. The box of claim 12, said vanes being rectangular in shape extending between the side wall and from the outlet side wall to the inlet wall and said inlet wall being arcuate.

16. The box of claim 12, said pivot mounts for the vanes being provided with pivot rods extending in the plane of the outlet side.

References Cited in the file of this patent
UNITED STATES PATENTS

| | | |
|---|---|---|
| 970,598 | Arnold | Sept. 20, 1910 |
| 2,687,076 | Phillips | Aug. 24, 1954 |
| 2,759,490 | Phillips | Aug. 21, 1956 |
| 2,787,288 | Shataloff | Apr. 2, 1957 |
| 2,850,043 | Samuelsson | Sept. 2, 1958 |
| 2,880,752 | Kreuttner | Apr. 7, 1959 |
| 2,936,123 | Kreuttner | May 10, 1960 |
| 3,053,454 | Waterfill | Sept. 11, 1962 |